United States Patent [19]
Weil et al.

[11] Patent Number: 4,910,240
[45] Date of Patent: Mar. 20, 1990

[54] THERMALLY STABLE DIPHOSPHONATE-TYPE FLAME RETARDANT ADDITIVE FOR PLASTICS

[75] Inventors: Edward D. Weil, Hastings-on-Hudson; John Tomko, Dobbs Ferry, both of N.Y.

[73] Assignee: Akzo America Inc., New York, N.Y.

[21] Appl. No.: 76,969

[22] Filed: Jul. 23, 1987

Related U.S. Application Data

[63] Continuation-in-part of Ser. No. 15,475, Feb. 17, 1987, abandoned, which is a continuation-in-part of Ser. No. 839,479, Mar. 14, 1986, abandoned.

[51] Int. Cl.$^4$ ................................................ C08K 5/53
[52] U.S. Cl. ......................................................... 524/125
[58] Field of Search .................. 528/287; 524/125, 123; 558/163; 106/18.18

[56] References Cited

U.S. PATENT DOCUMENTS

| | | | |
|---|---|---|---|
| 2,632,756 | 3/1953 | Harman et al. | 528/278 |
| 3,256,370 | 6/1966 | Fitch | 260/972 |
| 3,463,835 | 8/1969 | Burdnick | 260/932 |
| 3,830,890 | 8/1974 | Kerst et al. | 260/932 |
| 3,900,536 | 8/1975 | D'Alelio | 106/18.18 |

FOREIGN PATENT DOCUMENTS 2167077 12/1978 Fed. Rep. of Germany .

OTHER PUBLICATIONS

Sommer: CA 90, 168,732x, (1979).

Primary Examiner—Veronica P. Hoke
Attorney, Agent, or Firm—Richard P. Fennelly; Louis A. Morris

[57] ABSTRACT

Flame retardant polyester compositions are prepared by incorporating into a polymer from 1–20% by weight of a flame retardant having the structural formula:

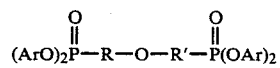

where Ar is aryl and R and R' are independently alkylene.

This class of flame retardant shows high temperature stability and permits incorporation of the flame retardant into the polyester by hot milling at temperatures up to about 390° C.

15 Claims, No Drawings

THERMALLY STABLE DIPHOSPHONATE-TYPE FLAME RETARDANT ADDITIVE FOR PLASTICS

CROSS-REFERENCE TO RELATED APPLICATION

This is a continuation-in-part application of U.S. Ser. No. 15,475, filed Feb. 17, 1987, now abandoned, which, in turn, is a continuation-in-part of U.S. Ser. No. 839,479, filed Mar. 14, 1986, now abandoned.

FIELD OF THE INVENTION

The present invention relates to novel flame retardant plastic compositions. This invention also teaches a novel method of making a flame retardant composition.

BACKGROUND OF THE INVENTION

Polymers as a class of materials are generally flammable. Considerable attention has been given the development of materials for incorporation into polymers to render them flame retardant.

A wide variety of phosphorus and halogen containing compounds have been shown in the prior art to impart flame retardancy to polymers, however, there are usually problems attendant the use of these materials. One source of difficulty for the incorporation of flame retardants relates to modern methods of hot milling polymer compositions. In hot milling techniques, the polymer is extruded with a heated screw mechanism, typically at temperatures above 210° C. and often as high as 390° C. Under these high temperature conditions both thermosetting and thermoplastic materials become workable and permit uniform inclusion of additional agents such as flame retardants. Unfortunately, flame retardants often participate in decomposition or side reactions which impart undesirable odor or color to the base polymer being processed. Other flame retardants become somewhat volatile under processing conditions and are not effectably retained during processing.

It is desirable to develop new flame retardant agents which are thermally stable, essentially non-volatile, and adaptable to high temperature milling technology.

SUMMARY OF THE INVENTION

According to the present invention, improved polymeric compositions are prepared by incorporating therein a flame retardant effective amount of a tetraaryl alkylene-oxygen-alkylene diphosphonate flame retardant.

This invention is also a process for preparing improved flame retardant polymers wherein the improvement comprises incorporating into the polymer the flame retardant of this invention.

DETAILED DESCRIPTION OF THE INVENTION

The Flame Retardant Component

The tetraaryl alkylene diphosphonates used as flame retardants in this invention may be prepared by transesterification/Arbuzov rearrangement. These rearrangement reactions and transesterifications are described in West German Patent No. 2,167,077 (Chemical Abstracts 90:168732x) wherein triphenylphosphite reacts with an alkanediol in the presence of metallic sodium.

The general formula of the flame retardant used in the composition and method of this invention is

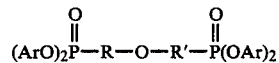

wherein Ar is an aryl group or alkyl-substituted aryl group or polyalkyl-substituted aryl group of 6 to 30 carbon atoms and R and R' are each an alkylene bridging group of from 1 to 6 carbon atoms and can be the same or different.

Preferably Ar is independently an aryl group selected from phenyl, methylphenyl, dimethylphenyl, ethylphenyl, isopropylphenyl, or tertiary butylphenyl. The Ar groups in the tetraaryl alkylene diphosphonate molecule may be the same or different, if desired.

The alkylene bridging groups (R and R') between the two phosphonate radicals and the oxygen heteroatom in the chain have the general formula—$(C_nH_{2n})$—and are preferably 2 to 4 carbon atoms. They can be the same or different.

The Polymeric Component of the Composition

The polymeric component of the present invention comprises polyester resins such as polyethylene terephthalate, polybutylene terephthalate, and the like.

The Composition Components the tetraaryl alkylene diphosphonates of the invention may be used as substantially the sole flame retardant in the composition. If desired, a mixture of tetraaryl alkylene diphosphonates may be used.

The compositions of the invention contain a flame retardant effective amount of tetraaryl alkylene diphosphonate flame retardant. A flame retardant effective amount of the diphosphonate flame retardant may be determined by preparing samples of flame retarded polymer and subjecting them to one or more flame retardancy tests (e.g., Underwriter's Laboratories Inc. "UL-94"; Standard Testing for Flammability of Plastic Materials for Parts in Devices & Appliances) until acceptable characteristics are obtained. Typically, from about 1 to 20 weight percent of the tetraaryl alkylene diphosphonate in the plastic composition will impart acceptable flame retardancy.

Optionally, the flame retardant of this invention may be used in combination with other known flame retardants, particularly, organic bromine or phosphorus compounds having known flame retardant utility. Nevertheless, the benefits arising from the presence of the flame retardants of this invention generally require that approximately at least one half of the flame retardant content of the desired flame retardant formulation originate from the inclusion of the tetraaryl alkylene diphosphonate. Examples of flame retardants and smoke suppressants which may be included in the formulations of this invention are decabromodiphenyl oxide, bis(pentabromophenoxy)ethane, polybrominated polystyrene, bis(tetrabromophthalimido)ethane, tetrabromobisphenol-A, hexabromocyclododecane, bis(tribromophenoxy)ethane, octabromodiphenyl oxide, molybdenum oxide and molybdates, zinc oxide and zinc salts, magnesium oxide and carbonate, antimony oxides, and alumina trihydrate.

Preparation of the Composition

The flame retardant is incorporated into the polyester polymer by a variety of mixing techniques. One technique is to granularize the polymer and flame retardant, mix these materials, and feed them to a hot mill extruder which melts the polymer and uniformly distributes the flame retardant throughout the molten polymer mass. Alternatively, the flame retardant can be added to the polymer during the process of hot mill extrusion, for example, through a feed port incorporated into the milling apparatus.

The process of the invention is illustrated in the following Examples.

EXAMPLE 1

This example illustrates preparation of the flame retardant additive used herein.

Triphenyl phosphite (2158.6 gm, 6.95 moles), 2-hydroxyethyl ether (368.7 gm, 3.47 moles) and methyl iodide catalyst (7.0 gm) were placed into a 3000 ml three-neck reaction flask fitted with a thermometer, magnetic stirrer, dropping funnel, air and dry ice condenser, and oil-heat bath. The mixture was heated and stirred while adding small, additional portions of methyl iodide. The reaction was followed gravimetrically by trivalent phosphorus analysis (mercuric chloride method).

The reaction proceeded as follows:

| Time Hrs/min | Pot Temp. (°C.) | CH$_3$I* (gms) | % Reaction** |
| --- | --- | --- | --- |
| 0/0 | 25 | 7.0 | 0 |
| 0/20 | 120 | 7.0 | — |
| 1/05 | 217 | 7.0 | — |
| 7/20 | 217 | 9.6 | — |
| 14/50 | 219 | 9.6 | 90 |
| 21/50 | 220 | 10.6 | 97 |
| 26/50 | 220 | 10.6 | — |

*total cumulative amount added
**by mercuric chloride analysis

The reaction mixture was then stripped:

| Time Hrs/min | Pot Temp. (°C.) | Pressure (mm Hg) |
| --- | --- | --- |
| 0/0 | 104 | 76 |
| 1/00 | 130 | 0.1 |
| 2/00 | 160 | 0.1 |

The product was recrystallized from isopropanol and the resulting crystals were stripped at 100° C. and 10 mm Hg to constant weight. The product (oxy-di-2,1-ethanediyl) bisphosphonic acid tetraphenyl ester having Chemical Abstracts Registry No. 69981-95-9) was a white crystalline solid with a melting point of 140.5° C.–146° C.

EXAMPLE 2

The compound from Example 1 was mixed with polybutylene terephthalate resin (VALOX 325 brand) in varying amounts by placing the polymer and compound in a test tube which was heated and stirred with a glass rod while keeping the test tube in a heated oil bath until all of the ingredients melted.

A fiberglass wick-equipped tube of polytetrafluoroethylene of 6 mm inside diameter was introduced into the melted mixture of polymer and flame retardant compound. Negative pressure was then applied to allow the molten polymer/flame retardant mixture to fill the tube, and the mixture was allowed to cool.

The tube was then cut lengthwise and a candle of polymer and flame retardant was separated therefrom.

The following Limiting Oxygen Index values were obtained:

| Flame Retardant* | Oxygen Index |
| --- | --- |
| 0 | 17.6 |
| 1 | 18.9 |
| 2 | 19.9 |
| 3 | 21.6 |

*parts by weight in 20 parts by weight of polymer.

We claim:

1. A flame retardant polyester composition comprising a polyester resin in admixture with a flame retardant effective amount of a flame retardant represented by the formula:

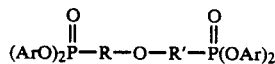

where Ar is aryl, alkyl-substituted aryl, or polyalkyl-substituted aryl and R and R' are independently an alkylene bridging group of from 1 to 6 carbon atoms.

2. The composition of claim 1 wherein the flame retardant is oxy-di-2,1-ethanediyl bisphosphonic acid tetraphenyl ester.

3. The composition of claim 1 wherein the polymer is polyethylene terephthalate.

4. The composition of claim 1 wherein the polymer is polybutylene terephthalate.

5. The composition of claim 2 wherein the polymer is polybutylene terephthalate.

6. The composition of claim 2 wherein the polymer is polyethylene terephthalate.

7. The composition of claim 1 wherein the flame retardant is present at from about 1 to about 20 weight percent of the composition.

8. The composition of claim 2 wherein the flame retardant is present at from about 1 to about 20 weight percent of the composition.

9. The composition of claim 1 wherein the group Ar is selected from phenyl, dimethylphenyl, methylphenyl, ethylphenyl, isopropylphenyl, tertiarybutylphenyl, or mixtures thereof.

10. The composition of claim 1 wherein the alkylene bridging group has 1 to 4 carbon atoms.

11. A method of making a flame retardant polyester composition by hot milling with the polyester a flame retardant effective amount of a flame retardant represented by the formula:

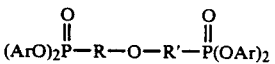

wherein Ar is aryl, alkyl-substituted aryl, and polyalkyl-substituted aryl, and R and R' are independently an alkylene bridging group of from 1 to 6 carbon atoms.

12. The process of claim 11 wherein the flame retardant is oxy-di-2,1-ethanediyl bisphosphonic acid tetraphenyl ester.

13. The process of claim 11 wherein the hot milling is performed at a temperature in the range of from about 210° C. to about 390° C.

14. The process of claim 11 wherein the polymer is polybutylene terephthalate.

15. The process of claim 11 wherein the polymer is polyethylene terephthalate.

* * * * *